Aug. 25, 1936.  S. MARCUS  2,051,876
DOLL EYE AND METHOD OF MAKING THE SAME
Filed May 25, 1935  2 Sheets-Sheet 1
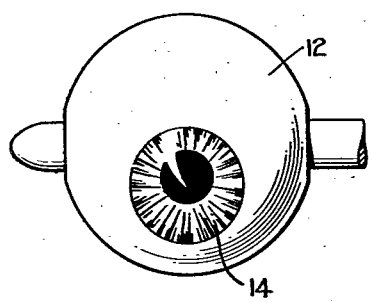
Fig. 1.
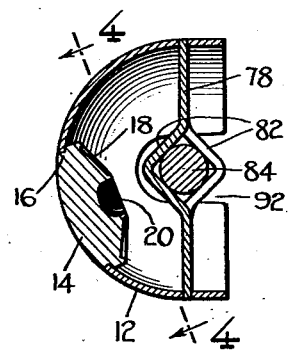
Fig. 2.
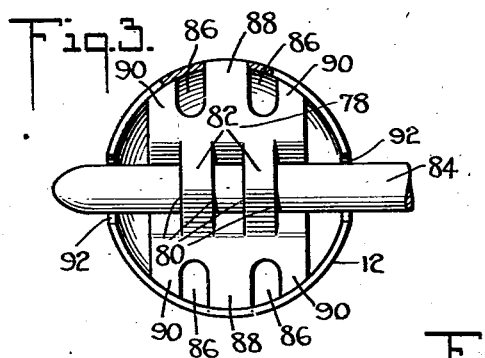
Fig. 3.
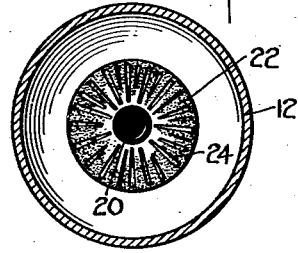
Fig. 4.
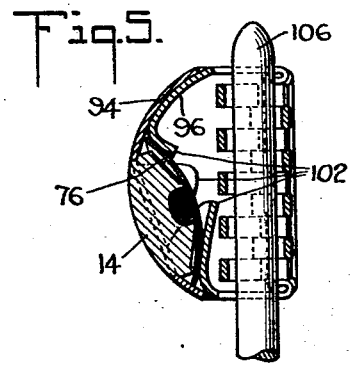
Fig. 5.
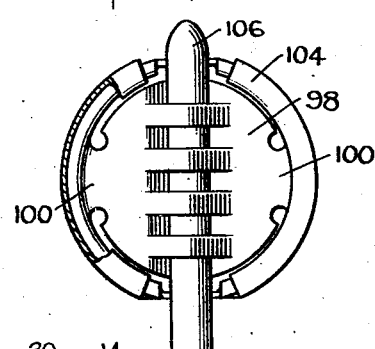
Fig. 6.
Fig. 7.
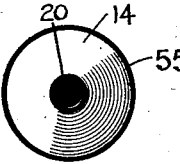
Fig. 1B.
INVENTOR
Samuel Marcus
BY
ATTORNEYS Aug. 25, 1936. S. MARCUS 2,051,876
DOLL EYE AND METHOD OF MAKING THE SAME
Filed May 25, 1935 2 Sheets-Sheet 2
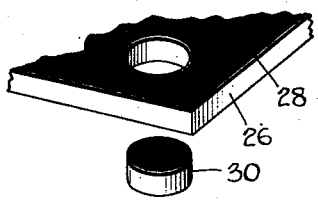
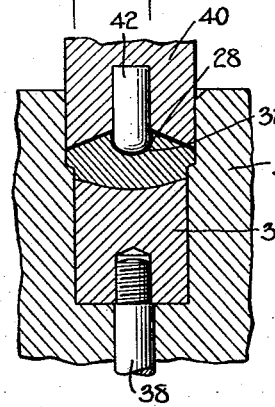
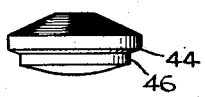
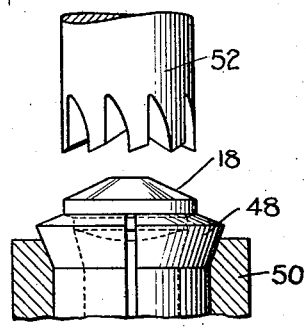
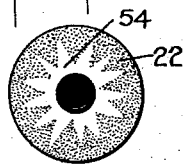
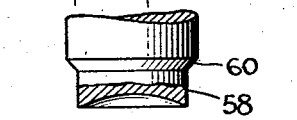
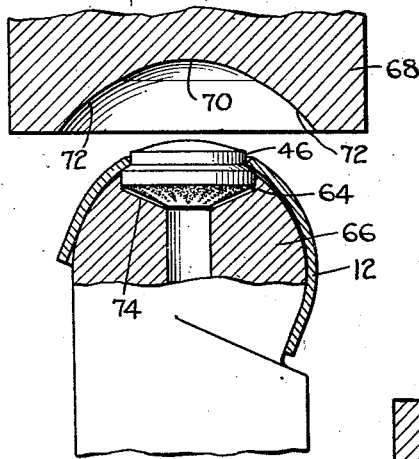
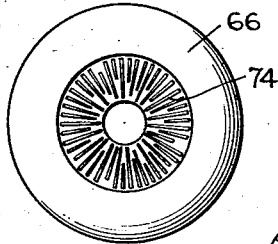
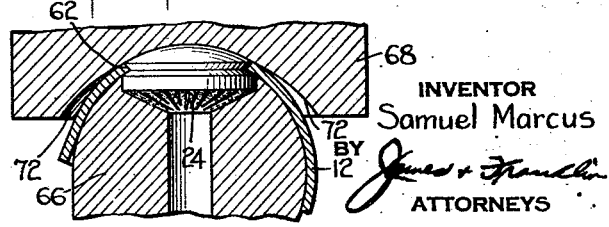
INVENTOR
Samuel Marcus
BY
ATTORNEYS Patented Aug. 25, 1936

2,051,876

UNITED STATES PATENT OFFICE 2,051,876

DOLL EYE AND METHOD OF MAKING THE SAME

Samuel Marcus, Belle Harbor, N. Y., assignor to Margon Corporation, New York, N. Y., a corporation of New York Application May 25, 1935, Serial No. 23,346

20 Claims. (Cl. 46—165)

This invention relates to doll eyes.

The primary object of my invention is to generally improve doll eyes and methods for making the same.

Lithographed metal eyes are cheap and strong but are in no way comparable in appearance with artificial eyes having a transparent lens. The latter type of eye has been made of glass and more recently of celluloid, a white sheet celluloid being used for the eye ball or shell, and a special lens being inserted and cemented thereto by the use of an appropriate solvent. This construction presents structural difficulties because the celluloid tends to stretch, warp, and change shape, and it has therefore been customary to reinforce the celluloid eye shell with a metallic shell about which the celluloid is drawn and anchored. This construction is relatively complex and costly. In accordance with one important feature and object of my invention, I provide a combined metal and celluloid eye, the shell being made of metal and being rigid and self-supporting, and the lens being made of celluloid or other transparent material. With this construction I retain the advantages of both the metal and celluloid eyes. The problem of securing the lens to the shell is overcome by undercutting or diverging the lens opening and expanding the lens in place. Iris lines or serrations may be indented on the back of the lens by the same pressure used to lock the lens and shell together.

A further object of my invention is to improve the lens itself by the provision of an intensely black well-defined pupil, and of iris coloring which tapers in intensity from the periphery toward the center of the lens; and by so designing the lens that the apparent gaze of the eye tends to follow the observer. The lens is made strong and fool-proof of a single piece of material by a process which preferably includes coating the back of a flat sheet of celluloid with black paint; stamping blanks or slugs therefrom; indenting a pupil simulation; and thereafter shaving or trimming the black coloring material from the back of the lens outside the pupil indentation. This results in an exceedingly cleanly defined pupil. During the formation of the pupil indentation, the lens may also be shaped to frustro-conical shape on the back surface and to spherical shape on the front surface with a preferably flanged or shouldered edge. The combination of lens depth and pupil indentation produces a peculiar optical illusion in that the eye tends to follow the gaze of the observer. The scraped back surface of the lens is in condition to have iris coloring printed directly thereon—a procedure having important advantages over the attempted use of a separate color disc with shaded coloring, because exact concentricity of the lens and disc is essential but difficult to obtain.

Other objects of my invention center about the mounting of the eye on a suitable cross rod or shaft, and are to provide a simple inexpensive form of back plate frictionally mounted on the cross rod for adjustment relative thereto and directly received in the eye shell by an inexpensive slot and tenon construction which itself permits adjustment of the eye relative to the back plate and cross rod.

To the accomplishment of the foregoing and other objects which will hereinafter appear, my invention consists in the doll eye elements and method for making the same, and their relation one to the other, as hereinafter are more particularly described in the specification and sought to be defined in the claims. The specification is accompanied by drawings, in which:

Fig. 1 is a front elevation of an eye embodying features of my invention;

Fig. 2 is a transverse section taken in elevation therethrough;

Fig. 3 is a partially sectioned rear elevation of the eye;

Fig. 4 is a section taken in the plane of the line 4—4 of Fig. 2;

Fig. 5 is a transverse section through a modified eye using a celluloid shell;

Fig. 6 is a partially sectioned rear elevation thereof;

Fig. 7 is a section through a lens of increased depth;

Fig. 8 shows the stamping of a blank or slug for the lens;

Fig. 9 illustrates the shaping of the lens;

Fig. 10 is a side elevation of the shaped lens;

Fig. 11 shows the manner in which the back coloring is removed from the lens;

Fig. 12 shows the back of the lens after being printed with iris coloring;

Fig. 13 illustrates the punching of a lens opening in a metallic shell;

Fig. 14 shows the divergence or undercutting of the wall of the opening;

Figs. 15 and 16 illustrate the manner in which the lens is locked to the shell;

Fig. 17 shows the exterior of the lower member of the tool used for that purpose; and Fig. 18 shows the back of a lens so trimmed as to leave a border.

Referring to the drawings and more particularly to Figs. 1 and 2, the eye in preferred form comprises a metallic shell 12 and a lens 14 made of a suitable transparent material, preferably celluloid. The lens and shell are mechanically interlocked at the periphery 16 of the lens, as by causing the edge of the lens opening to diverge outwardly, and expanding the lens to tightly fill the lens opening. The outer surface of the lens is curved and conforms to the spherical contour of the shell. The inner wall of the lens includes a frusto-conical portion 18 which increases the effective thickness of the lens. The pupil simulation 20 is indented to a substantial depth and is coated with an intense black coloring on the bottom and sides of the indentation. The back surface of the lens is preferably printed with suitable iris coloring, as is indicated at 22 in Fig. 4, and is indented with radial serrations 24 which simulate iris lines.

The manner in which the lens is produced and combined with the shell may be described with reference to Figs. 8 through 17 of the drawings. A relatively thick sheet of celluloid 26 is preliminarily coated on its back surface with a layer of appropriate black coloring 28. Circular slugs or blanks 30 are stamped from sheet 26, as is clearly shown in Fig. 8. The blank 30 is next indented, as shown at 32 in Fig. 9, to form the eye pupil, it being understood that the blank coating 28 extends entirely around the interior of the pupil indentation. During this operation, the lens is preferably formed to desired shape, and for this purpose a die is used comprising a female portion 34 a part 36 of which is elevatable by an ejector rod 38 to eject the lens. The male portion 40 carries a pin 42 to form the pupil identation and is so shaped outside the pin as to give the lens the desired frusto-conical shape.

The lens then takes the form illustrated in Fig. 10, and it will be noted that the periphery of the lens is flanged or shouldered at 44, the cylindrical portion 46 being dimensioned to fit through the lens opening in the shell.

The lens is next placed in a suitable fixture, and the black coating is trimmed or shaved from the back of the lens. In Fig. 11 I show a collet or split chuck 48 the jaws of which may be sprung together or released by vertical movement of a ring 50. The lens is inserted in collet 48 and gripped thereby, whereupon a spinning cutter 52 is lowered into engagement with the frustro-conical back surface 18 of the lens, thereby trimming the black paint therefrom. The pupil is thus cleanly and accurately defined by the pupil identation itself, and it is unnecessary to subsequently apply back paint to the pupil. It will be understood, however, that if desired the lens may be formed of unpainted celluloid and the pupil indentation may be painted manually after the forming step illustrated in Fig. 9 but prior to the trimming step illustrated in Fig. 8, the latter then being used primarily to correct the irregularities caused by overflow of black paint around the edge of the pupil indentation.

The surface of the lens is left in a smooth but unpolished condition which is excellent for taking iris coloring next applied thereto. This coloring should preferably shade or taper in intensity from the periphery toward the center of the lens. A shaded color disc may be mounted in back of the lens in the finished eye, but perfect concentricity is then required. I have found that the back of the lens may be directly printed with a single shade of coloring, the area rather than the intensity of coloring being varied. Thus, referring to Fig. 12, the lens is printed with a suitable color, say blue, but a star-shaped area 54 is left in unprinted condition at the center of the lens. This shaping of the color, while noticeable at this stage of the process, is subsequently made unnoticeable by the mutilation of the rear surface of the lens which takes place when forming radial serrations or iris lines on the back of the lens. The finished lens when viewed from the front appears simply to shade in color depth, as is desired.

The apparent coloring of the iris may, if desired, be intensified by leaving a narrow black border at the edge of the lens. This is illustrated in Fig. 18 which shows the back of a lens after the trimming operation in which the trimming tool is somewhat smaller in diameter than the outside diameter of the lens. In such case the original black coating of the celluloid is left not only at the pupil but also at the periphery, as indicated by the numeral 55. This expedient is useful with dark or brown eyes and even then should be used only when sharp definition and contrast at the edge of the lens is desired.

The eye shell is prepared, as by drawing sheet metal to the desired approximately hemispherical form. The drawn blanks are then punched to form the desired lens opening therein, and this step is illustrated in Fig. 13 in which an embryo shell 12 is placed over the matingly shaped head 56 of the female portion of the punch, the head being biased as shown in order to locate the lens below the center of the shell, as shown in Figs. 1 and 2. The cutting portion 58 of the punch is cylindrical, but immediately above the cylindrical part 58 I provide an outwardly tapered shoulder 60 the object of which is to flare the wall of the lens opening outwardly. It will be understood that the stroke of the punch is such as to bring the tapered part 60 against the shell with a working blow thus leaving the shell in the condition shown in Fig. 14 in which it will be seen that the edge or wall 62 of the lens opening is not cylindrical but is outwardly undercut or divergent.

The punched shell is next sand-tumbled and then painted white, preferably by spray painting. I find it desirable to paint the shells after the punching operation, rather than to use white lithographed sheet metal, not only to avoid injury to the lithographed surface, but also because it is desirable to paint the edge of the lens opening as well as the exterior. This avoids a metallic gleam which may become visible through the lens.

The lens is next secured to the shell, and this is preferably done by the method illustrated in Figs. 15 and 16. The lens is placed in a seat 64 formed at the top of a head 66 dimensioned to receive the shell 12, and the shell is then placed over the lens. A preferably heated tool 68 descends and compresses and thereby expands the lens, causing the cylindrical edge 46 of the lens to flow outwardly against the undercut or flared edge 62 of the shell opening. The lens is thus effectively riveted on opposite sides of the material of the shell, and the parts are securely interlocked. The surface 70 of tool 68 is contoured to mate with the spherical surface of the shell so that at the end of the operation the lens is brought into smooth flush continuity with the surface of the shell. The peripheral surface 72 of tool 68 is preferably enlarged or cut away, as shown, in order not to mar the painted surface of the shell.

The bottom wall 74 of seat 64 receiving the lens during the mounting operation is preferably serrated (see Fig. 17) in order to form the desired radial serrations or iris lines 24, and the same pressure used to expand and lock the lens in the shell also serves to form the iris lines. To complete the eye, a colored disc of paper may next be cemented behind the lens. It is not necessary when dealing with a brown eye because the sheet of celluloid used in the first instance may be of a brown tint, and the printing on the back of the lens, as shown in Fig. 12, affords adequate coloring. However, I find it desirable to use a backing sheet when dealing with blue or gray eyes not only to improve the color of the eyes and to exclude light from the back of the eye, but also because I find it possible to obtain several different color casts or shades for lenses printed alike. It should be understood that the color disc is uniform in color, and no problem of concentric centering of the disc arises. The desired tapering of intensity within the eyes is obtained as a result of the printing on the back of the lens, as heretofore explained in connection with Fig. 12.

The use of a color disc is illustrated in Fig. 5, and referring to that figure it will be seen that a paper disc 76 is placed behind the lens 14. With the eye of Fig. 1 the disc is cemented in place at its edge to the interior of the shell outside the periphery of the lens.

To complete the eye, it is next necessary to provide suitable means for mounting the same on a cross rod or shaft. I have devised simplified means for this purpose, best illustrated in Figs. 2 and 3. I use a sheet metal backing plate 78 the center portion of which is incised at 80 to form oppositely displaced straps 82 dimensioned to receive a suitable cross rod 84. The straps are preferably squared, as shown in Fig. 2, because this provides a tight frictional grip on the cross rod while permitting a large manufacturing tolerance. The ends of back plate 78 are notched at 86 to form central tenons 88 and side fingers 90, all extending transversely of cross rod 84. The side fingers 90 are shaped and dimensioned to fit within the shell 12, while tenons 88 are elongated and pass through mating slots at the top and bottom of the shell.

Tenons 88 are relatively narrow, as shown, in order to afford manual adjustment of the eye relative to the back plate and cross rod, it being possible to turn the eye toward one side or the other by twisting the tenons. At the same time, the side fingers 90 act as locating means. The sides of the shell are notched at 92 to clear the cross rod with a substantial clearance which allows room for the aforesaid adjustment of the eye. To place the back plate 78 in the eye, the plate is preliminarily placed on a key or rod. One of the tenons 88 is then slipped into its mating slot, and the shell is then stretched slightly to receive the other tenon. The shell is temporarily sprung but not permanently deformed.

While the combination metal and celluloid eye so far described is preferred, it is possible to use the improved lens of my invention with a celluloid shell, and such a construction is shown in Figs. 5 and 6 of the drawings. Referring to said figures, the lens 14 is secured to a celluloid shell 94 which is placed over a metal shell 96. The metal shell is formed integrally with a back plate 98 but is severed therefrom except at diametrically opposite points 100. The corners of the original sheet metal blank, which are bent forwardly to form the shell, are intended as shown at 102 to clear the lens. The rear edge 104 of the celluloid shell is drawn around the back of the metal shell and turned inwardly, as is best shown in Fig. 6. With this arrangement, as with that heretofore described, two adjustments of the eye relative to the cross rod 106 are possible, one being a rotation of the eye about the cross rod, and the other being a twisting of the eye about the back plate at the points 100. It will be noted, however, that in the present case the eyes are mounted as though for use in a rolling eye set in which the shafts 106 are vertical, whereas in the arrangement shown in Figs. 1 through 4 the cross rod or shaft is disposed horizontally. These arrangements are, however, interchangeable, it being necessary only to shift the location of the lens opening relative to the cross rod. For sleeping eyes the lens opening is dropped transversely of the cross rod, whereas for rolling eyes the lens is dropped longitudinally of the cross rod.

It has already been mentioned that one advantage of the present lens is an optical illusion, whereby the apparent gaze of the lens appears to follow the observer. I am not certain of the explanation of this phenomenon, but believe it due to two factors: first, the thickness of the lens because this gives it a magnifying effect and locates the pupil back of the lens surface so far that upon sideward movement of the observer the pupil is seen through the side rather than the center of the lens; and secondly, the indentation of the pupil, whereby it has both front and side wall surfaces, because upon sideward movement of the observer, as the front wall of the pupil is seen less, the side wall of the pupil comes more into view.

The effect in question may, if desired, be heightened by further increasing the depth of the lens, and a lens modified to this end is illustrated in Fig. 7. In ordinary commercial work it is not necessary to increase the lens thickness to the extent shown in the arrangement of Fig. 7, but even in the form shown in Fig. 2 it will be noted that the depth of the lens is equal to half of the lens diameter, and I believe the thickness should not be reduced noticeably below this value if the benefit of the optical illusion in question is to be retained to a substantial degree.

It is believed that the construction of my improved doll eye as well as the method for making the same, and the many advantages thereof, will be apparent from the foregoing detailed description. It will also be apparent that while I have shown and described my invention in preferred forms, many changes and modifications may be made without departing from the spirit of the invention, defined in the following claims.

I claim:

1. A doll eye comprising a metal shell apertured to receive a lens made of transparent material, said lens being flanged or shouldered within the shell at the aperture, the wall of said aperture being outwardly undercut, and said lens being expanded against said wall to lock the lens in place.

2. A doll eye comprising an approximately hemispherical sheet metal shell apertured to receive a lens made of celluloid or like transparent material, said lens being flanged or shouldered within the shell at the aperture, the wall of said aperture being outwardly divergent, and said lens being expanded against said wall to lock the lens in place.

3. A doll eye comprising a metal shell, and a back plate for said shell, the center of said plate being arranged to receive a cross rod, and the ends of said plate being formed into tenons passing through slots in the eye shell, said tenons being twistable to afford adjustment of the eye relative to the cross rod.

4. A doll eye comprising an approximately hemispherical sheet metal shell apertured to receive a lens made of celluloid or like transparent material, said lens being flanged or shouldered within the shell at the aperture, the wall of said aperture being outwardly divergent, said lens being expanded against said wall to lock the lens in place, and a back plate for said eye shell, the center of said plate being incised to form oppositely displaced straps for receiving a cross rod, and the ends of said plate being notched to form central tenons and side fingers extending transversely of the cross rod, said fingers being curved and dimensioned to just fit within the eye shell, and said tenons passing through slots in the eye shell.

5. A lens for a doll eye, said lens being made of transparent material and comprising a smooth outer surface following the contour of a sphere, a frustro-conical back surface giving the lens substantial depth at the central portion thereof, a forwardly struck recess at the center of the back surface, and a black coating on the bottom and sides of said recess to simulate an eye pupil.

6. A lens for a doll eye, said lens being made of transparent material and comprising a smooth outer surface, a frustro-conical back surface giving the lens substantial depth at the central portion thereof, a forwardly struck recess at the center of the back surface, and a black coating on the bottom and sides of said recess to simulate an eye pupil, said frustro-conical rear surface being impressed with radial serrations.

7. A lens for a doll eye, said lens being made of transparent material and comprising a smooth rounded outer surface, a frustro-conical back surface giving the lens substantial depth at the central portion thereof, a forwardly struck recess at the center of the back surface, and a black coating on the bottom and sides of said recess to simulate an eye pupil, said frustro-conical rear surface outside the pupil recess being printed with iris coloring tapered in area and apparent intensity from the periphery toward the center of the lens.

8. A lens for a doll eye, said lens being made of celluloid and comprising a smooth outer surface following the contour of a sphere, a frustro-conical back surface giving the lens substantial depth at the central portion thereof, a forwardly struck recess at the center of the back surface, and a black coating on the bottom and sides of said recess to simulate an eye pupil, said frustro-conical surface being printed with iris coloring tapering in area and apparent intensity from the periphery toward the center of the lens and being impressed with radial serrations.

9. A doll eye comprising a metal shell apertured to receive a lens made of transparent material, said lens being flanged or shouldered within the shell at the aperture and being expanded against the wall of the aperture to lock the lens in place, said lens having a smooth outer surface following the contour of the shell, a frustro-conical back surface giving the lens substantial depth at the central portion thereof, a forwardly struck recess at the center of the back surface, and a black coating on the bottom and sides of said recess to simulate an eye pupil.

10. A doll eye comprising a metal shell apertured to receive a lens made of transparent material, said lens being flanged or shouldered within the shell at the aperture, the wall of said aperture being outwardly undercut and said lens being expanded against said wall to lock the lens in place, said lens having a smooth outer surface following the contour of the shell, a frustro-conical back surface giving the lens substantial depth at the central portion thereof, a forwardly struck recess at the center of the back surface, and a black coating on the bottom and sides of said recess to simulate an eye pupil, the frustro-conical rear surface outside the pupil recess being impressed with radial serrations.

11. In the manufacture of doll eyes, the method which includes forming a metallic shell with a lens opening and shaping the wall of said opening to diverge outwardly, placing a flanged lens through said opening from inside the shell, and pressing the lens to spread the same against the diverging wall opening and to thereby lock the lens and shell together.

12. In the manufacture of doll eyes, the method which includes drawing a metallic shell to approximately hemispherical form, punching a lens opening in said shell, placing a lens in said opening, and heating and pressing the lens to lock the same in the opening, and at the same time indenting the rear surface of the lens with a plurality of radial serrations.

13. In the manufacture of doll eyes, the method which includes forming a metallic shell, punching a lens opening in said shell and causing the wall of said opening to diverge, placing a flanged lens through said opening, heating and pressing the lens to spread the same against the diverging wall and to lock the lens and shell together, and at the same time indenting the rear surface of the lens with a plurality of radial serrations.

14. In the manufacture of doll eyes, the method which includes drawing a metallic shell to approximately hemispherical form, punching a lens opening in said shell and shaping the wall of said opening to diverge outwardly, painting the exterior face and said wall opening, placing a flanged lens through said opening from inside the shell, and heating and pressing the lens to spread the same against the diverging wall opening and to thereby lock the lens and shell together.

15. In the manufacture of doll eyes, the method which includes coating one side of a sheet of celluloid with black paint, punching a slug or blank from said sheet, indenting a pupil simulation on the rear wall thereof, and thereafter shaving the black paint from the rear of the lens except at the pupil recess.

16. In the manufacture of doll eyes, the method which includes coating one side of a sheet of celluloid with black paint, punching a slug or blank from said sheet, pressing said blank to indent a pupil simulation on the rear wall thereof and to impart a spherical surface and shouldered edge at the front portion thereof, and thereafter shaving the black paint from the rear of the lens except at the pupil recess.

17. In the manufacture of doll eyes, the method which includes coating one side of a flat sheet of celluloid with black paint, punching a slug or blank from said sheet, pressing said blank to frusto-conical shape at the rear wall thereof and to indent a pupil simulation at the center of said surface and to impart a spherical surface and shouldered edge at the front portion thereof, and thereafter shaving the black paint from the rear of the lens except at the pupil recess.

18. In the manufacture of doll eyes, the method which includes coating one side of a sheet of celluloid with black paint, punching a slug or blank from said sheet, indenting a pupil simulation on the rear wall thereof, thereafter shaving the black paint from the rear of the lens except at the pupil recess, and printing the shaved surface with iris coloring material.

19. In the manufacture of doll eyes, the method which includes coating one side of a sheet of celluloid with black paint, punching a slug or blank from said sheet, indenting a pupil simulation on the rear wall thereof, shaving the black paint from the rear of the lens except at the pupil recess, forming a metallic shell with a lens opening, placing the lens in said opening, and pressing the lens to lock the lens and shell together.

20. In the manufacture of doll eyes, the method which includes coating one side of a sheet of celluloid with black paint, punching a slug or blank from said sheet, indenting a pupil simulation on the rear wall thereof, flanging the periphery thereof, shaving the black paint from the rear of the lens except at the pupil recess, drawing a metallic shell to approximately hemispherical form, forming an outwardly undercut lens opening in said shell, placing the lens through said opening from inside the shell, and heating and pressing the lens to lock the same in place.

SAMUEL MARCUS.